United States Patent [19]

Killian

[11] 4,065,979
[45] Jan. 3, 1978

[54] TRAVELING NUT STOP ASSEMBLY

[75] Inventor: Henry R. Killian, Sugarland, Tex.

[73] Assignee: Keystone International, Inc., Houston, Tex.

[21] Appl. No.: 669,141

[22] Filed: Mar. 22, 1976

[51] Int. Cl.² .......................................... F16H 27/02
[52] U.S. Cl. ........................... 74/89.15; 74/424.8 R; 85/1 SS; 151/20; 151/36
[58] Field of Search ............................. 403/371, 344; 74/424.8 A, 89.15, 526; 85/1 SS; 151/20, 36, 34, 16

[56] References Cited

U.S. PATENT DOCUMENTS

| | | | |
|---|---|---|---|
| 1,346,867 | 7/1920 | Weibull | 85/1 SS |
| 1,347,124 | 7/1920 | Schrader | 151/20 |
| 2,379,794 | 7/1945 | Egert | 151/20 |
| 2,838,948 | 6/1958 | Lassy | 74/424.8 A |
| 2,894,408 | 7/1959 | Verhoeff | 74/424.8 A |

FOREIGN PATENT DOCUMENTS

| | | | |
|---|---|---|---|
| 440,861 | 7/1967 | Switzerland | 403/371 |

*Primary Examiner*—Samuel Scott
*Assistant Examiner*—Wesley S. Ratliff, Jr.
*Attorney, Agent, or Firm*—Browning, Bushman & Zamecki

[57] ABSTRACT

A stop assembly for limiting relative rotation comprising inner and outer coaxial members relatively rotatable but longitudinally fixed with respect to each other. The outer member at least partially surrounds the inner member and is at least partially radially spaced therefrom so that an elongate annular space is formed between the members. A first stop surface is provided at one end of the annular space facing axially inwardly. A stop nut is disposed in the annular space coaxial therewith. The nut has a radial split therethrough. The nut is rotatable and longitudinally movable with respect to one of the members and longitudinally movable but not rotatable with respect to the other member. The nut further includes a second stop surface at one end opposed to the first stop surface. One of the stop surfaces inclueds a stop area engageable with the other stop surface adjacent the trailing side of the split, as the nut is advanced toward the first stop surface, with the remainder of the one stop surface spaced from the other stop surface.

12 Claims, 8 Drawing Figures

TRAVELING NUT STOP ASSEMBLY

BACKGROUND OF THE INVENTION

1. Field of the Invention

The present invention relates to rotary mechanisms in which one member, such as a shaft, is rotated relative to another member, such as a surrounding casing. For example, in actuators for driving various mechanisms such as valves, actuator assemblies may be provided which are operated by rotating an input shaft and which serve to convert this input rotation to rotary motion of the valve element about another axis or to linear motion. Such valves and their actuators are frequently buried underground, as for example in pipelines, or otherwise not susceptible to visual inspection. In such instances, the actuator input shaft or an extension thereof extends to the surface or to a point where operation of the actuator can be carried out.

The mechanism is usually designed to have a high mechanical advantage and low efficiency; thus a substantial number of turns of the shaft are necessary to bring the valve from a full open to a full closed position. This prevents the valve from being opened or closed too rapidly and renders the mechanism more capable of generating high output loads. However, the high mechanical advantage also cooperates with the high torque which may be generated in operation by the relatively long shaft to present a problem of excessively high input forces which can damage the actuator mechanism. This problem is further complicated by the fact that the operator of the mechanism can not see the valve or actuator, and thus it is difficult for him to tell if he has rotated the shaft too much.

One solution to this problem is to oversize the actuator so that it will be capable of withstanding these forces. However, this makes the actuator unduly expensive and bulky. The other alternative is to provide a stop means which prevents further rotation of the input shaft in one direction when the valve is open and preferably also prevents further rotation in the other direction when the valve is closed. This not only prevents the actuator mechanism from being damaged but also provides a means for the operator to know when the shaft has been rotated sufficiently to bring the valve to the desired position.

2. Description of Prior Art

One of the ways of providing stop means for the above purpose is to provide an elongate annular space between the input shaft, or its extension, and a stationary casing through which it extends. Opposed stationary stop surfaces are disposed at opposite ends of the space facing axially inwardly. A stop nut is disposed in the space coaxial therewith, i.e. surrounding the shaft. The nut is splined or otherwise keyed to either the shaft or the casing and is threaded to the other. Thus the nut can move longitudinally with respect to both the shaft and the casing, but rotates relative to only one of them. As the shaft is rotated, the nut will move along the annular space until it engages one of the stop surfaces whereby further rotation of the shaft will be prevented.

One of the problems with this type of stop assembly is that the same high forces which would cause damage to the actuator if the stop means were not present now cause jamming of the nut against the stationary stop surface so that extremely high separation forces are required to back the nut off from that surface when the valve position is to be changed.

This problem may be alleviated by providing a coarse pitch (more efficient) thread on the stop nut. However, this increases the overall length of the device and may cause the stop assembly to become overly bulky.

SUMMARY OF THE INVENTION

The present invention relates to improvements in a stop assembly of the type described above. In accord with the present invention, the stop nut or sleeve has a radial split therethrough and each of the end faces of the nut defines a stop surface opposed to a respective one of the stationary stop surfaces. Considering each pair of opposed stop surfaces, one on the nut and one stationary at the end of the annular space, one of the stop surfaces includes a stop area engageable with the other stop surface adjacent the trailing side of the split as the nut is advanced toward the stationary stop surface with the remainder of the one stop surface spaced from the other stop surface. Thus as the nut advances toward one of the stationary stop surfaces, the stop area will engage adjacent the trailing side of the split in the nut. Then further rotation of the shaft will act to widen the split and spread the nut. A large portion of the torque is thus translated into hoop stress which loads the stop nut radially rather than jamming the end face into the stop surface.

The above expedients drastically reduce the separation forces and break-away torque which is needed to back the nut off from the stop surface. It is especially advantageous that the material and design of the nut be such that its elastic limits are not exceeded by spreading which occurs when the stop areas engage and rotation is continued, i.e. that the split will narrow somewhat when the nut is backed off from the stop surface. This makes the radial loading of the threads self-relieving when the nut begins to back off.

By thus reducing the forces to which the nut and other parts of the stop assembly must be subjected, the present invention allows the use of fine pitch threads on the nut, with the consequent high mechanical advantage, and generally permits the stop assembly to be made as small and inexpensive as possible.

It is thus a principal object of the invention to provide a stop assembly for limiting relative rotation in which separation forces between the nut and the stop surfaces and the forces for disengaging the stops are minimized.

Another object of the invention is to provide an improved stop assembly which is relatively small and inexpensive.

Still another object of the invention is to provide a stop assembly which allows the use of fine pitch threads on the stop nut.

Other objects, features, and advantages of the invention will be made apparent by the following description of the preferred embodiments, the drawings, and the claims.

DESCRIPTION OF THE PREFERRED EMBODIMENTS

Figure 1:
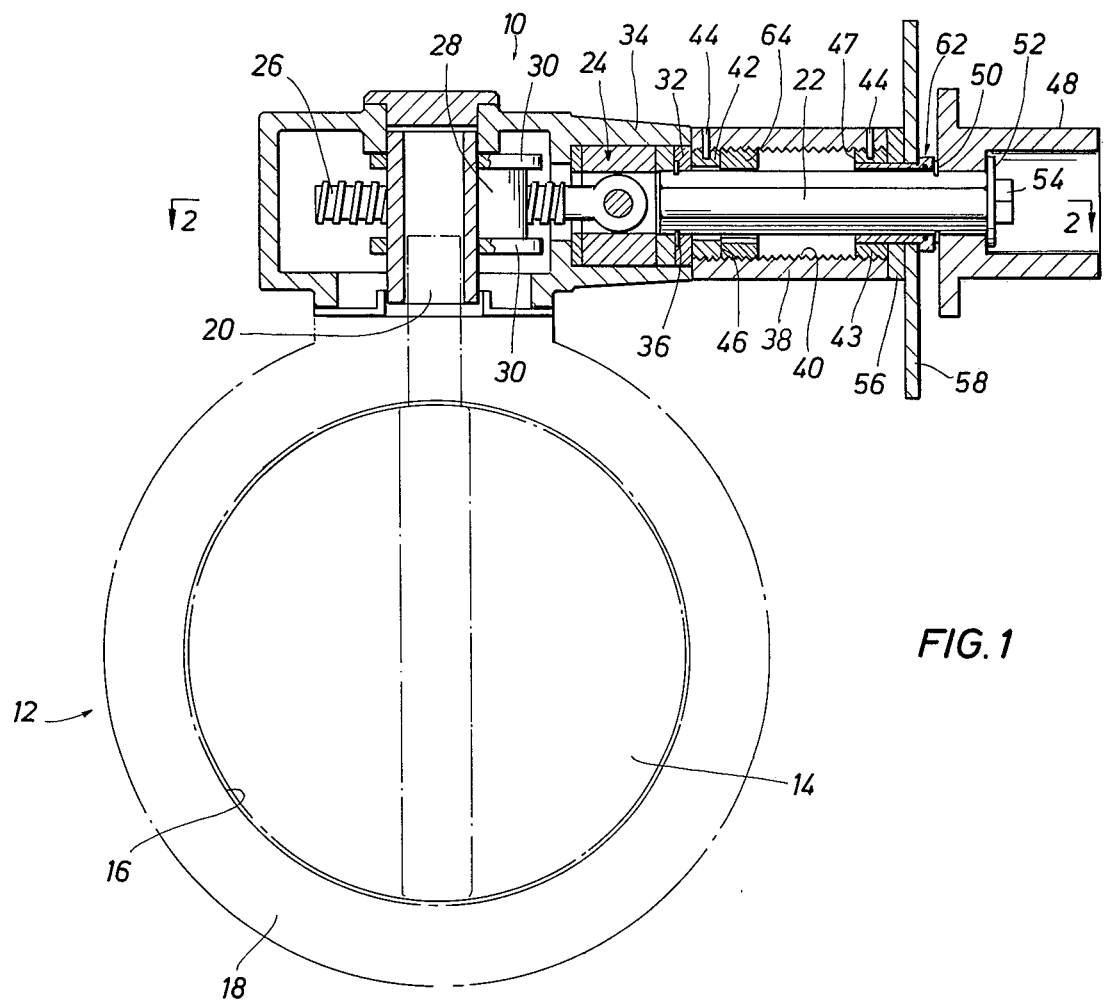
FIG. 1 is a longitudinal cross-sectional view of the stop assembly of the invention in association with a valve and valve actuator.
Figure 2:
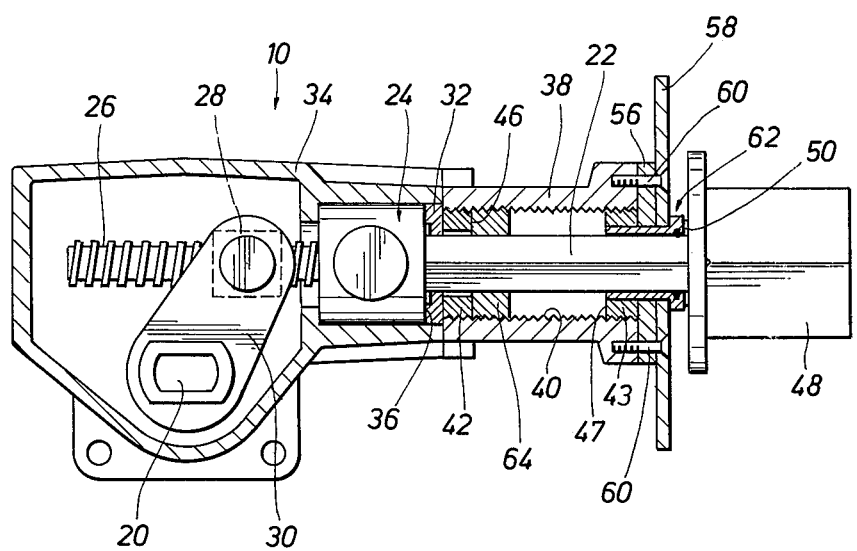
FIG. 2 is another longitudinal cross-sectional view of the apparatus of FIG. 1 taken on lines 2—2 thereof.
Figure 3:
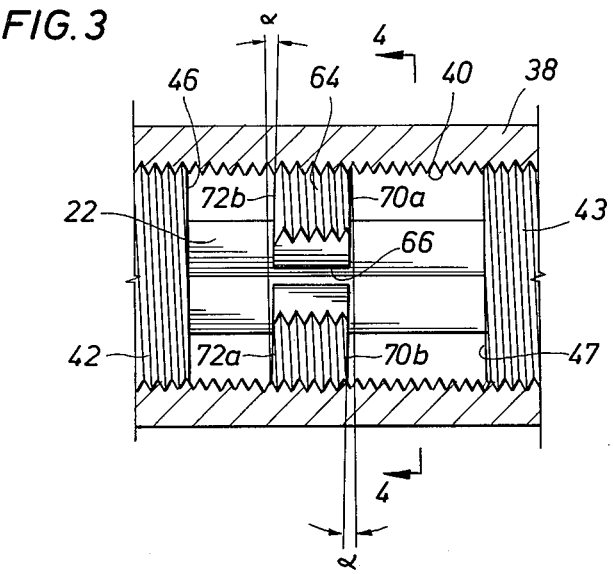
FIG. 3 is an enlarged detail view of the casing, shaft and nuts.
Figure 4:
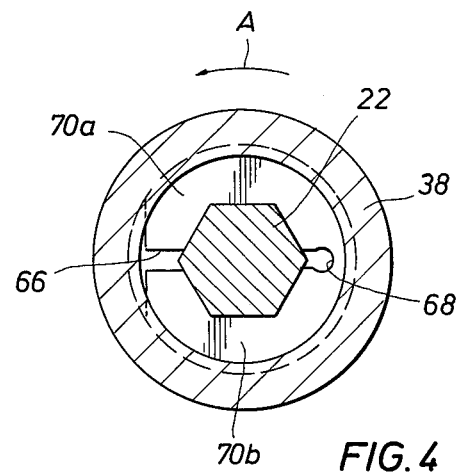
FIG. 4 is a transverse cross-sectional view taken on lines 4—4 of FIG. 3.

Referring to FIGS. 1 and 2 there is shown a valve actuator 10 for opening and closing an attached disc valve 12. The actuator 10 is of the type more fully disclosed in my prior copending application Ser. No. 640,440, filed Dec. 15, 1975, now U.S. Pat. No. 4,123,432. Although the stop assembly may be used with numerous other types of actuators as well as with other types of rotary mechanisms, it is believed that a brief explanation of the valve 12 and actuator 10 will be helpful in understanding one use of the present invention.

The valve 12 is a rotary valve having a valve element in the form of a disc 14 mounted in the bore 16 of a valve body 18. Disc 14 is shown in closed valve position and may be opened by rotating the attached stem 20 about its own axis 90°. The valve actuator accomplishes this rotation by rotation of its input shaft 22 about an axis transverse to stem 20. This rotation is imparted via a universal joint 24 to a drive screw 26 which is fixed against longitudinal movement. A drive nut 28 is threaded onto screw 26 and is pivotally connected to the swinging ends of a pair of link arms 30. The arms 30 are keyed to the upper end of valve stem 20.

It can thus be seen that as screw 26 is rotated, nut 28 will move longitudinally therealong swinging arms 30 in an arc and rotating stem 20. The universal joint 24 permits the screw 26 to swing laterally to accomodate the arc of arms 30. Shaft 22 is mounted for rotation by a bearing ring 32 in the actuator housing 34, but longitudinal movement of shaft 22 is prevented by a snap ring 36.

The stop assembly of the invention comprises a substantially tubular internally threaded casing 38 rigidly affixed to the actuator housing 34 in any suitable manner as by welding, bolts, etc. so that it surrounds a portion of shaft 22 and is coaxial therewith. The inner diameter of casing 38 is substantially larger than the greatest outer diameter of shaft 22 so that an elongate annular space 40 is formed between the casing and shaft. A pair of retainer nuts 42 and 43 are threaded into opposite ends of casing 38 so that they surround shaft 22 and are fixed in place by dowel pins 44 extending through casing 38 and into the nuts 42 and 43. Nuts 42 and 43 thus define respective annular stationary stop surfaces 46 and 47 facing axially inwardly at opposite ends of the space 40.

An extension handle 48 is rigidly affixed to the outer end of shaft 22 by retainer rings 50, washer 52 and screw 54. An annular retainer plate 56 for the outer retainer nut 43 and an adapter flange 58 are rigidly affixed to the casing 38 by screws 60. A seal assembly 62 surrounds shaft 22 from the inner end of the outer retainer nut 43 to the retainer ring 50. It can thus be seen that shaft 22 can rotate with respect to casing 38 but can not move longitudinally.

A movable stop nut 64 is disposed in the annular space 40. Nut 64 is threaded into casing 38 and is keyed to shaft 22 by the hexagonal shape of its bore which is matched by the hexagonal exterior of shaft 22. Thus nut 64 can move longitudinally with respect to casing 38 and shaft 22 but can rotate only with respect to casing 38. As shaft 22 is rotated, nut or sleeve 64 will move longitudinally along space 40 until it engages one of the stop surfaces 46 or 47. This will stop the longitudinal movement of nut 64 and consequently prevent further rotation of shaft 22 in the same direction. This in turn tells the operator that the valve element 14 has been moved to either a fully open or a fully closed position (depending on the direction of rotation of shaft 22) and precludes damage to the actuator mechanism due to excessive rotation.

Referring now to FIGS. 3–6, it can be seen that the stop nut 64 has a radial split 66 therethrough. Opposite split 66 is a notch 68 which extends from the interior of nut 64 partially radially therethrough. When the nut 64 is rotated in a right-hand direction, as indicated by the arrow A in FIG. 4, it will advance toward stop surface 47. Thus the axial end face of nut 64 defines a stop surface which faces stop surface 47 and which may be considered to be comprised of two substantially semi-annular portions 70a and 70b separated from each other by the split 66 and notch 68. It can thus be seen that portion 70a is adjacent the trailing side of split 66 as the nut is advanced toward surface 47, while portion 70b is adjacent the leading side. Surface 47 is defined by a plane perpendicular to the axis of the shaft 22. End face 70a, 70b is defined by a plane inclined with respect to the plane of surface 47, as indicated by the angle a, so that portion 70a lies closer to surface 47 than portion 70b.

Thus, as nut 64 is advanced toward surface 47, the outermost area of portion 70a, which lies intermediate split 66 and notch 68 will first engage surface 47 and thus serve as a stop area while the remainder of surface 70a, 70b will be spaced from surface 47. Then upon further rotation of shaft 22, the split 66 will widen and the nut 64 will spread, the portion adjacent notch 68 acting somewhat as a hinge, so that much of the torque is translated into hoop stress loading the threads of nut 64 and casing 38 rather than jamming the surface 70a, 70b against or into the surface 47.

Figure 5:
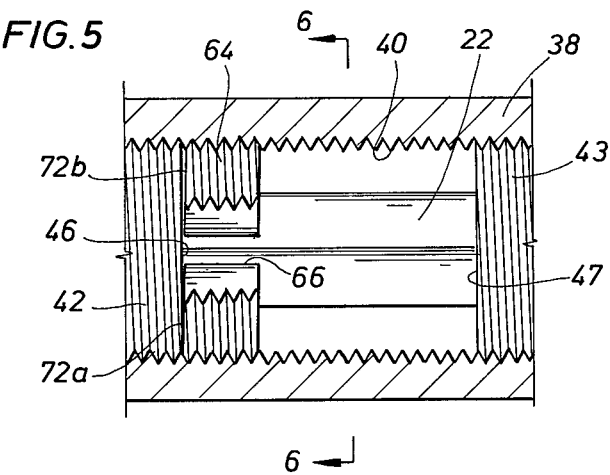
FIG. 5 is a view similar to that of FIG. 3 with the parts shown in another position.
Figure 6:
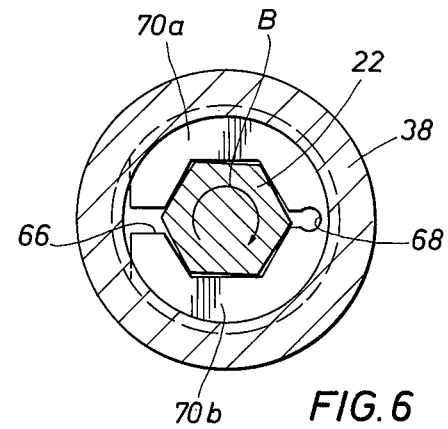
FIG. 6 is a view similar to that of FIG. 4 but taken on lines 6—6 of FIG. 5.

Similarly, left-hand rotation of nut 64 will advance it toward surface 46. Surface 46 is parallel to surface 47, and the opposed surface 72a, 72b of nut 64 is parallel to end face 70a, 70b. Thus, portion 72a of the surface 72a, 72b will be adjacent the trailing side of split 66 when the nut is advanced toward surface 46 and is also disposed closer to surface 46 than is portion 72b. FIGS. 5 and 6 show the positions of the parts of the stop assembly when the nut 64 has engaged surface 46 and shaft 22 is further rotated in the left-hand direction indicated by arrow B. As seen in FIG. 5, only the stop area (lowermost) of portion 72a is engaging surface 46. The remainder of surface 72a and portion 72b are spaced therefrom. FIG. 6 shows how hexagonal shaft 22 has become cocked in the matching bore of nut 64 and is acting as a wrench to effect the spreading of the nut 64 and widening of split 66 (compare FIG. 4).

Because the engagement of a stop surface of nut 64 with the opposed stationary stop surface 46 or 47 is substantially limited to the relatively small stop area in the center of the portion adjacent the trailing side of the split, and because much of the torque which would have otherwise jammed the end face of the nut into the opposed stop surface has been translated into hoop stress loading the threads, the break-away torque required to back the nut 64 off from the stationary stop surface is much less than would be the case without the split and stop area. This effect is enhanced by the fact that the nut 64 is so composed and designed that it will be resilient. Thus as nut 64 is backed from the stop surface, it contracts re-narrowing the split 66. Thus the nut 64 is self-relieving and is capable of being used many times. It will be realized that the material of the nut and its design are preferably such that its elastic limits will not be exceeded by the forces to which it will be subjected in use.

Figure 7:
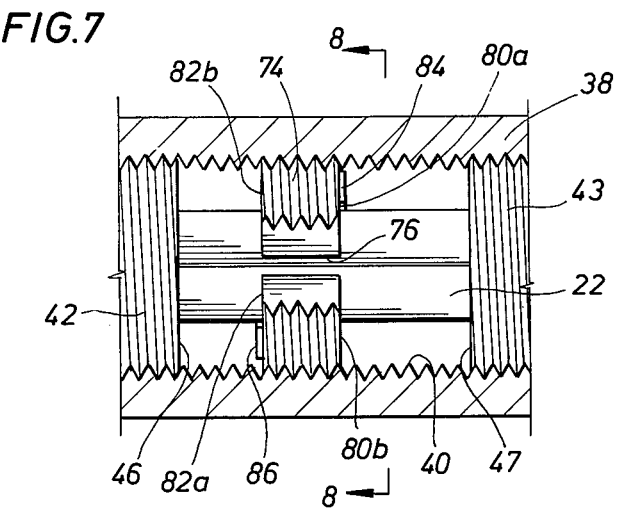
FIG. 7 is a view similar to that of FIG. 3 showing another embodiment of the invention.
Figure 8:
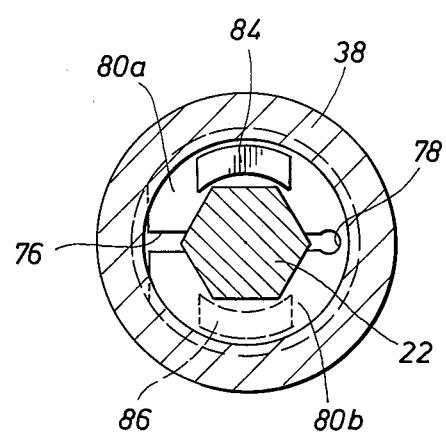
FIG. 8 is a view similar to that of FIG. 4 taken on lines 8—8 of FIG. 7.

Turning now to FIGS. 7 and 8, there is shown another embodiment of the invention which is substantially similar to that of the preceding figures except for the construction of the stop nut 74. Nut 74 has a split 76 identical to split 66 and a notch 78 identical to 68, and is otherwise identical to nut 64 except for its stop surfaces 80a, 80b and 82a, 82b. These surfaces are not inclined with respect to the stationary stop surfaces 46 and 47 but are parallel thereto. The stop areas are provided by upsets 84 and 86 rigidly carried by portions 80a and 82a respectively of the stop surfaces of the nut. Portions 80a and 82a are each adjacent the trailing side of split 76 when the nut 74 is advanced toward the opposed stop surface 47 or 46 respectively. Note that the upsets are located in the same positions as the stop areas of the other embodiment. As best seen in FIG. 7, upset 84 lies closer to surface 47 than portion 80b of the corresponding stop surface adjacent the leading side of split 76 as nut 74 moves toward surface 47. Similarly, upset 86 is closer to surface 46 than the portion 82b adjacent the leading side of split 76 as nut 74 moves toward surface 46. Thus as the nut 74 is advanced toward either of the stop surfaces 46 or 47, the corresponding upset 84 or 86 will engage the stationary stop surface adjacent the trailing side of the split 76, and the function of the nut 74 will be substantially the same as that of the nut 64 in the first embodiment.

Numerous modifications of the preferred embodiments described above will suggest themselves to those skilled in the art. For example, in the embodiments illustrated, means have been provided for limiting rotation of shaft 22 in either direction. However, in some instances it may be sufficient to merely provide means for limiting rotation in one direction. Another modification might involve threading the stop nut to the shaft 22 and non-rotatably connecting it to casing 38. In each of the embodiments shown above, the stop area is on the stop nut. However, in less preferable embodiments, the stop area may be formed on the stationary stop surface at a location where it will engage the stop surface of the nut adjacent the trailing side of the split. This may be accomplished either by inclining the stationary stop surfaces or providing them with upsets or in any other suitable manner. Furthermore, it may not always be necessary that the stationary stop surfaces form complete annuli. It is thus intended that the scope of the invention be limited only by the claims which follow.

I claim:

1. A stop assembly for limiting relative rotation comprising:
    an inner member;
    an outer member coaxial with and at least partially surrounding said inner member, said outer member being at least partially radially spaced from said inner member to form an elongate annular space between said members;
    means defining a first stop surface facing axially inwardly at one end of said annular space;
    means permitting relative rotation but preventing relative longitudinal movement between said members;
    and a stop sleeve disposed in said annular space coaxial therewith and having a radial split therethrough, said sleeve being rotatable and longitudinally movable with respect to one of said members and longitudinally movable but not rotatable with respect to the other of said members and having a second stop surface at one end generally opposed to said first stop surface, one of said stop surfaces including a stop area engageable with the other of said stop surfaces adjacent the trailing side of said split as said sleeve is advanced toward said first stop surface, with the remainder of said one stop surface being spaced from said other stop surface.

2. The stop assembly of claim 1 wherein said one stop surface is said second stop surface and said first stop surface is annular.

3. The stop assembly of claim 2 wherein said split is widened upon engagement of said stop area and continued relative rotation of said members, and wherein said sleeve is elastic whereby said split is narrowed upon disengagement of said stop area.

4. The stop assembly of claim 3 wherein said sleeve further has a notch opposite said split extending radially outwardly from the interior of said sleeve partially therethrough.

5. The stop assembly of claim 3 wherein said stop surfaces are defined by relatively inclined planes.

6. The stop assembly of claim 5 wherein said first stop surface is substantially perpendicular to the axis of said members.

7. The stop assembly of claim 3 wherein said stop area is defined by an upset rigidly carried by said second stop surface.

8. The stop assembly of claim 3 wherein said one member is said outer member and said other member is said inner member.

9. The stop assembly of claim 8 wherein said outer member is a casing member and said inner member is a shaft member, said stop sleeve being threaded to said casing member and keyed to said shaft member.

10. The stop assembly of claim 9 wherein said first stop surface is defined by a retainer nut threaded into said casing member.

11. The stop assembly of claim 10 wherein said shaft member is an input shaft for operating an actuator.

12. The stop assembly of claim 1 further comprising means defining a third stop surface facing axially inwardly at the other end of said annular space and substantially identical to said first stop surface, and wherein said sleeve has a fourth stop surface at the other end generally opposed to said third stop surface and substantially identical to said second stop surface.

* * * * *